May 11, 1926.
H. A. S. HOWARTH
1,584,174
AIR COOLED THRUST BEARING
Filed March 16, 1922    2 Sheets-Sheet 2
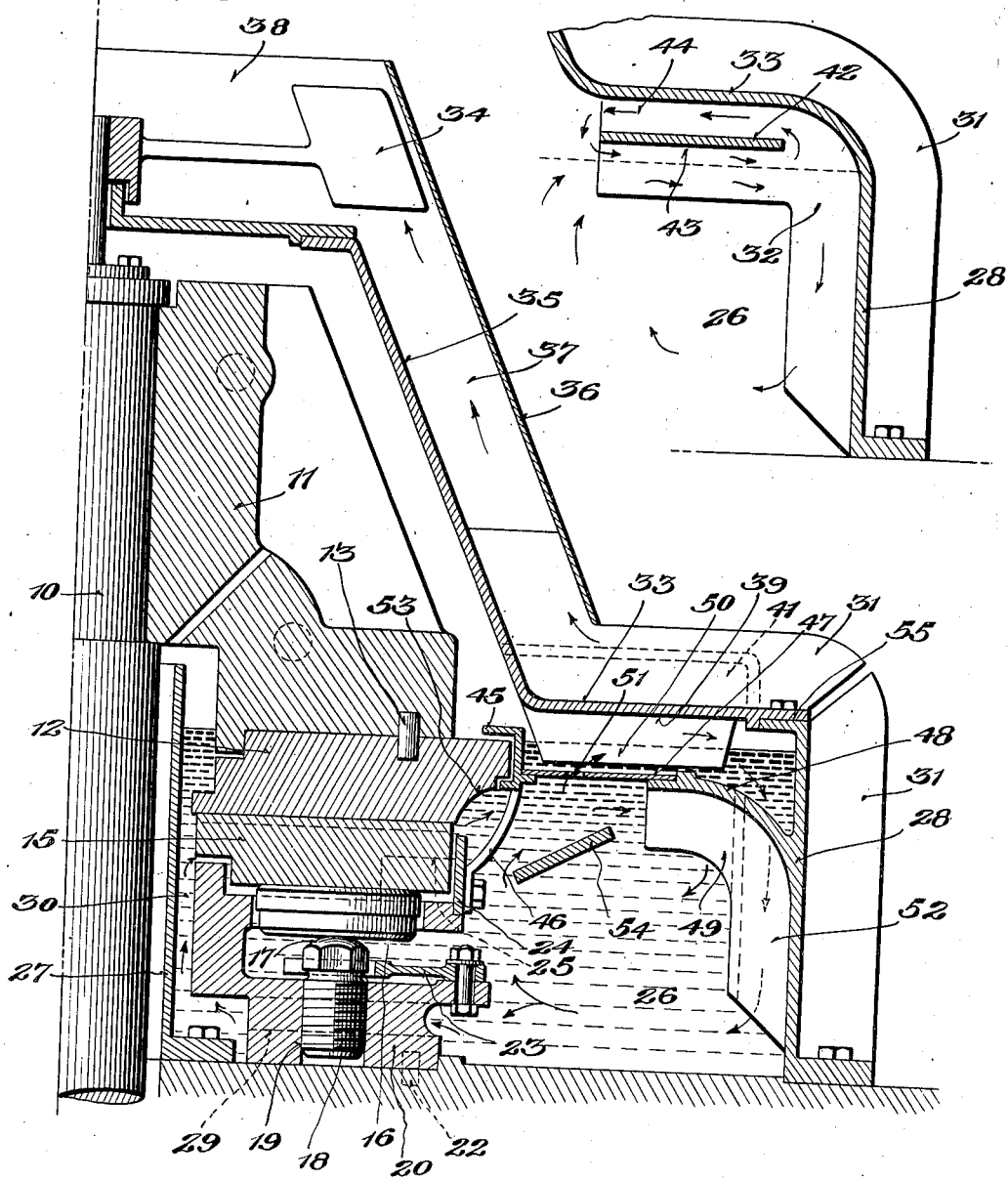
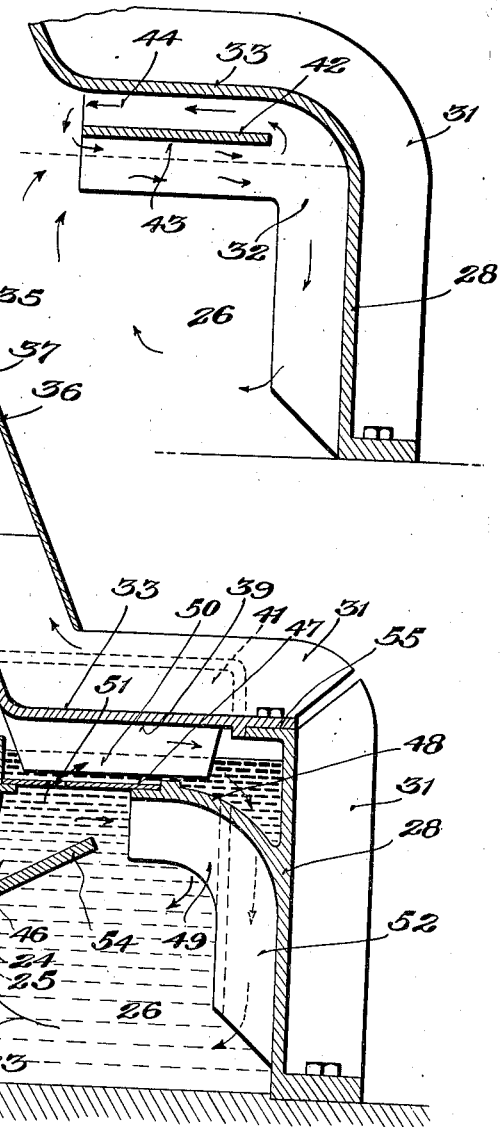
Inventor
Harry A. S. Howarth
By Mauro, Cameron, Lewis & Kerkam
Attorneys Patented May 11, 1926.

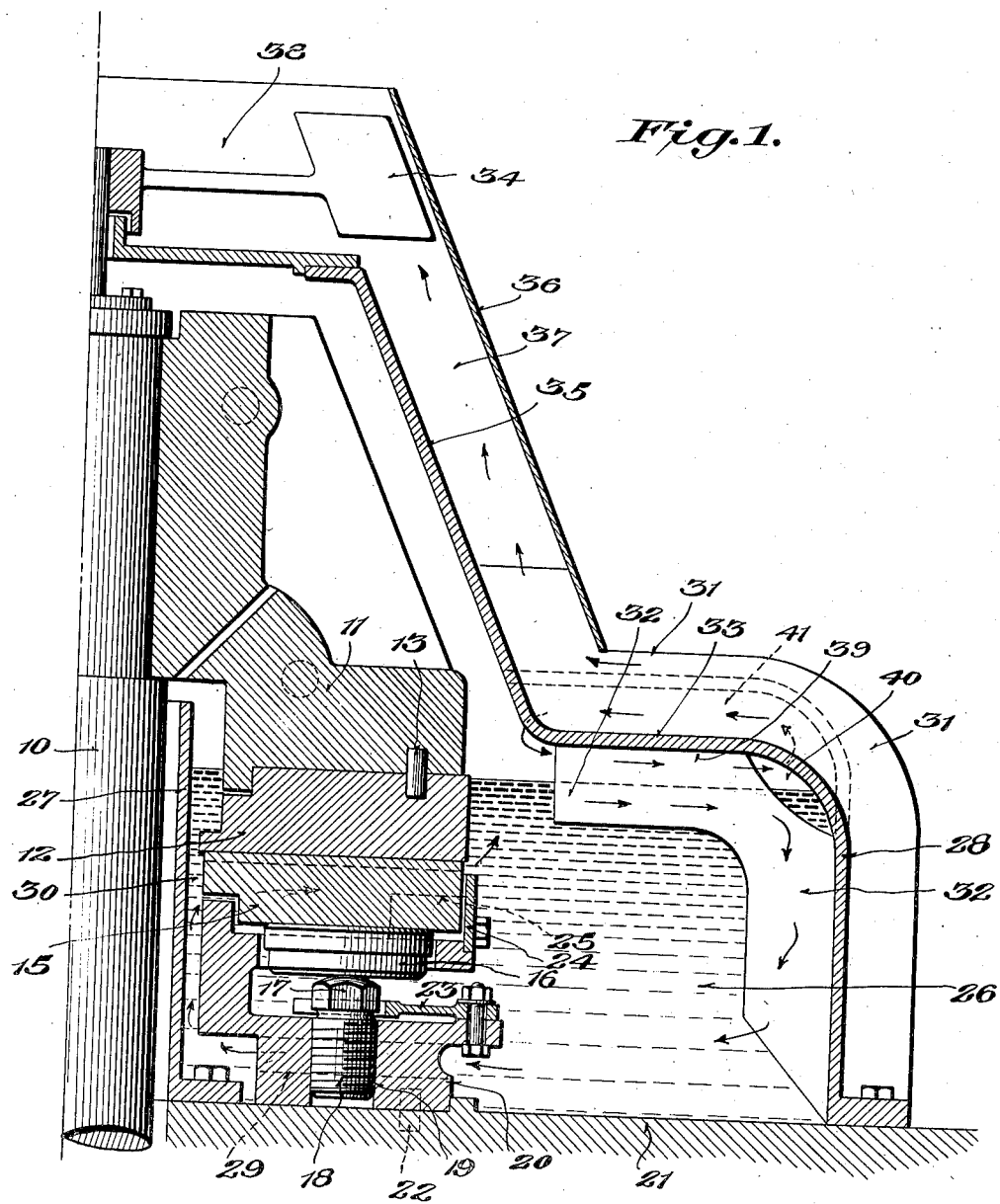

1,584,174

UNITED STATES PATENT OFFICE.

HARRY A. S. HOWARTH, OF PHILADELPHIA, PENNSYLVANIA, ASSIGNOR, BY MESNE ASSIGNMENTS, TO KINGSBURY MACHINE WORKS, INC., OF PHILADELPHIA, PENNSYLVANIA, A CORPORATION OF DELAWARE.

AIR-COOLED THRUST BEARING.

Application filed March 16, 1922. Serial No. 544,223.

This invention relates to thrust bearings and, more particularly, to means for dissipating the heat engendered by the operation of the bearing.

While it has heretofore been proposed to utilize air circulation for cooling journal bearings, it has been considered necessary in the case of thrust bearings, owing to the relatively large quantities of heat developed therein by the friction losses, to dissipate the heat by circulating a cooling liquid through the bearing parts or the lubricating oil or by circulating the lubricating oil through external oil-cooling devices. Where the friction losses in the thrust bearing are relatively small, however, as is particularly true of the flexible or tiltable segment type of bearing invented by Albert Kingsbury, the quantities of heat to be dissipated are correspondingly less, and it is an object of this invention to provide a thrust bearing construction wherein the bearing parts and the lubricating oil are maintained at a proper temperature without circulating a cooling liquid through the bearing parts or the lubricating oil and without circulating the lubricating oil through external oil cooling devices.

Another object of this invention is to provide a thrust bearing construction whereby the heat engendered by the operation of the bearing may be readily dissipated to the air.

Another object of this invention is to provide a thrust bearing construction whereby dissipation of heat to the air is facilitated by interior air circulation, or exterior air circulation, or both.

Another object of this invention is to provide a thrust bearing construction which enables an efficient dissipation of heat to the air without the air and lubricating oil being churned together, even though the shaft have a relatively high speed of rotation.

Other objects will appear as the description of the invention proceeds.

Stated broadly, the invention comprises a thrust bearing having, in combination with relatively-rotatable thrust-bearing members, a housing or reservoir for the lubricating oil, and means exteriorly of said housing or reservoir, or interiorly thereof, or both, for conveying and dissipating the heat of the bearing to the air.

The invention is capable of receiving a variety of mechanical expressions some of which are shown on the accompanying drawings, but it is to be expressly understood that the drawings are for purposes of illustration only and are not to be construed as a definition of the limits of the invention, reference being had to the appended claims for that purpose.

Referring in detail to said drawings, wherein the same reference characters are used to designate corresponding parts in the several figures:—

Fig. 1 is half axial section of a thrust bearing embodying the present invention:

Fig. 2 is a half axial section of another thrust bearing embodying the present invention;

Fig. 3 is a fragmentary section to illustrate a different form of means for directing the interior air circulation.

In the form shown in Fig. 1, 10 is a shaft provided, in any suitable way, with a thrust block 11, of any suitable construction, said block 11 carrying any suitable thrust collar 12 connected therewith in any suitable way, as by the dowel pins 13. Cooperating with the bearing face of the thrust collar 12 is a stationary thrust bearing member of any suitable construction but, in order to reduce the friction losses to a minimum, preferably composed of a plurality of flexible or tiltable bearing segments or shoes 15. In the construction illustrated, each bearing shoe 15 is mounted on a block 16 which, in turn, is tiltably or pivotally mounted on the spherical head 17 of an adjustable bolt 18 received in a screw-threaded opening 19 in the base ring 20, said base ring being supported on the frame or foundation 21 and suitably prevented from rotation, as by dowel pins 22. Suitable means, as lock wrenches 23, are provided for retaining the bolts 18 in their adjusted positions, and the shoes 15 are prevented from radially-outward and rotational movements by the retaining ring 24 and the spacing blocks or projections 25, respectively. It is to be expressly understood, however, that the details of construction of the bearing parts per se constitute no part of the present invention.

To flood the thrust bearing surfaces with lubricant, the bearing is provided with an oil reservoir of any suitable construction. In the form shown, the oil reservoir is formed by the annular space 26 between the interior retaining wall 27, suitably supported on the frame or foundation 21 and closely surrounding the shaft 10, and the exterior housing wall 28, also suitably supported on the frame or foundation 21. The level of the oil in the reservoir is preferably maintained above the level of the thrust bearing surfaces so that the oil may completely fill the spaces between and around the bearing shoes 15. As the thrust collar rotates, the lubricant is drawn between the relatively rotating bearing surfaces to form wedge-shaped oil films in conformity with the principle of operation of the bearings invented by Albert Kingsbury; also, owing to the action of centrifugal force on the oil in contact with and adjacent to the rotating parts, the oil is caused to circulate in a generally spiral direction in the body portion of the reservoir 26, some of this circulating oil returning through passages 29, suitably provided in the base ring 20, to the annular space 30 at the inner side of the bearing surfaces, and thence through the spaces between the bearing shoes into operative relation to the bearing surfaces. A circulation of oil is therefore normally maintained in the reservoir, the major portion of this circulation taking place in a generally spiral direction in the space between the exterior periphery of the bearing members and the housing wall, with which circulating oil the hot oil is mixed as it comes from the bearing surfaces. If no means are provided for dissipating this heat, the body of oil in the reservoir will rise to a temperature which will impair the efficiency of the bearing and, because of this fact, it has heretofore been the practice to locate in the reservoir a cooling coil, through which a cooling liquid is circulated to abstract the heat from the oil, or else circulate the oil through external cooling devices. Either of these methods of dissipating the heat necessitates the use of auxiliary cooling devices, whether interior or exterior of the oil reservoir, and means for circulating the cooling liquid or the oil through said cooling devices. It is the object of the present invention to eliminate these auxiliary cooling devices and circulating systems, and to effect the dissipation of heat by its conduction to the air.

To this end, the exterior wall 28 of the oil reservoir, or the wall of the housing, is provided with a plurality of heat conducting elements, shown as in the form of axially extending ribs 31 spaced around the periphery of the reservoir or housing. Any suitable number of ribs may be employed and they may be of any suitable width and thickness. These external ribs serve the dual function of providing heat conducting fins by which the heat is readily dissipated to the exterior air and channels through which the air may circulate to carry off the heat delivered thereby. To facilitate the conduction of the heat from the oil to the wall of the reservoir or housing, said wall is also preferably provided with a plurality of inwardly extending heat conducting elements or ribs 32, of any suitable number and dimensions, in heat interchanging relation with the wall of said reservoir or housing. Whereas the external ribs 31 are preferably disposed in axial planes, however, the internal ribs 32 are preferably arranged more or less circumferentially or helically so as not to interfere with the normal direction of circulation of the oil in the reservoir under the centrifugal action developed by the rotation of the thrust collar. When the invention is applied to a thrust bearing for a substantially vertical shaft as shown, the upper wall of the reservoir or housing is preferably directed inwardly over the free surface of the oil as shown at 33, and the ribs 31 and 32 preferably extend across this portion of the reservoir or housing, as well as the peripheral portion 28 thereof, so as to extend the heat conducting surface of the ribs 32 in contact with the body of the oil in the reservoir. Also, if desired, the frame or foundation 21 may be provided with heat-conducting ribs, so positioned as to offer the minimum resistance to the circulation of the oil, to facilitate heat interchange between the oil and the wall 21.

While the dissipation of heat through the external ribs 31, aided by the convectional currents of air set up through the channels between said ribs, would probably be sufficient in some cases to effect an efficient dissipation of the heat from the bearing, I prefer to provide the bearing with means of any suitable construction for positively circulating air over the exterior of the housing or reservoir and through these channels. In the form shown, a fan 34, of any suitable construction, is suitably mounted on or driven by the shaft 10, and the bearing housing is vertically extended as shown at 35, and provided with an exterior hood or casing 36, to provide an annular chamber 37 through which the air channels between the ribs 31 communicate with the fan chamber 38. The channels between the ribs 31 may, if desired, be extended to the fan chamber 38 by extending the ribs 31 up the side of the vertical extension 35 of the housing or, as shown, the ribs 31 may be terminated a short distance within the lower end of the hood 36. Also, if desired, the casing or hood 36 can be extended nearly to the base of the housing or reservoir, preferably in substantially parallel relation to the exterior wall thereof, or it can be extended directly to said base and provided with any suitable air admitting openings communicating with the interior thereof through its wall or otherwise. The fan 34, owing to its rotation with or by the shaft 10, draws the air up through the annular chamber 37 and thereby causes a rapid circulation of air over and between the ribs 31 to render said ribs more efficient in their dissipation of the heat to the outside air. In place of a fan however, advantage may be taken of the circulation of air induced by the rotation of other parts; thus for example when the bearing is used in conjunction with a generator the casing 36 could be extended so that air set in motion by the rotor of the generator will flow through the channels afforded by the exterior ribs 31.

As the oil moves outward under the action of centrifugal force, owing to the rotation of the thrust collar, the movement of its free surface induces a corresponding movement of the air adjacent thereto, and I preferably take advantage of this induced circulation of air within the housing or reservoir to further aid in the dissipation of the heat to the exterior air. To this end, the portion of the housing or reservoir 33 which overlies the free surface of the oil preferably extends in relatively close proximity thereto so that the circulation of the air induced by the movement of the oil tends to build up a pressure in the air at the outer ends of the channels 39 included between each successive pair of inwardly extending ribs 32. These channels 39 communicate at their outer ends through apertures 40 suitably provided in the ribs 32 with inwardly directed air passages or channels 41 of larger cross section than the channels 39. Accordingly, as indicated by the arrows in Fig. 1, the air drawn through the channels 39 by the movement of the oil flows through the apertures 40 into the channels 41, and thence returns through the latter to the inner space of the housing, the air taking up heat from the oil and delivering it to the wall of the housing or reservoir.

In place of providing separate air passages or channels 41 in the wall of the housing or reservoir as shown in Fig. 1, the space between each successive pair of inwardly projecting ribs 32, and between the overlying free surface of the oil and the overlying portion 33 of the housing or reservoir, may be provided, as shown in Fig. 3, with an interior partition 42 extending approximately parallel to the free surface of the oil and in close proximity thereto so as to provide a relatively narrow air passage or channel 43 which communicates at its outer end around one end of the partition 42 with the inwardly directed air passage or channel 44 of larger cross section provided above said partition. The circulation of air induced by the movement of the oil is shown by the arrows and, as in the construction shown in Fig. 1, facilitates the dissipation of the heat to the wall of the housing or reservoir.

When the shaft rotates at a relatively high speed, means should be provided to prevent the oil and air from being churned together at the free surface of the oil, because the lubricating capacity of the oil may become seriously affected if a considerable quantity of air becomes mixed with the same. In the form shown in Fig. 2, I have illustrated means for preventing churning of the oil and air at the free surface of the oil when the runner periphery moves at a relatively high speed. Said means may be of any suitable construction, the form shown comprising an air seal ring 45, of the construction disclosed and claimed in the application of Albert Kingsbury and myself Serial No. 534,970 filed Feb. 8, 1922, supported in any suitable way, as by brackets 46 from the base ring 20, and a baffle plate 47 extending below the free surface of the oil from the air seal ring 45 to a suitable projection or ledge on the wall of the housing or reservoir. In the construction illustrated in Fig. 2 the outer wall 28 of the reservoir or housing is provided with an inwardly directed wall 48 on which the outer edge of the baffle plate 47 is mounted, and inwardly extending ribs 49, corresponding to the ribs 32, extend along the inner face of the outer wall 28 to its junction with the inwardly directed wall 48, and thence inwardly across the full width of the latter. Inwardly extending ribs 50, which correspond with the horizontally extending portions of the ribs 32 in the embodiment of Fig. 1, are also provided and project downwardly from the overlying portion 33 of the housing or reservoir into the free surface of the oil.

In order that the oil may circulate into heat interchanging relation with the ribs 50, the baffle plate 47 may be provided with a plurality of apertures 51 and, and in order that the oil circulating through said apertures may return freely to the body of the oil in the reservoir, suitable apertures or passages are provided through the wall 48 adjacent the peripheral wall of the reservoir. In the form shown, passages 52 are provided between adjacent ribs 49 and communicate at their opposite ends with the body of oil above the wall 48 and with the main body of oil in the reservoir 26 adjacent the bottom of the same. Therefore some of the oil moved outwardly by the action of centrifugal force may pass up through the apertures 51 into heat interchanging relation with the ribs 50, and thence return to the body of oil in the reservoir through the passages 52 while, at the same time, the churning of the oil with the air at the free surface of the oil is prevented by the air seal ring 45 and baffle plate 47. If desired, the quantity of oil flowing through the apertures 51 may be increased by shaping the periphery of the thrust collar as shown at 53 so that it tends to direct the oil set in motion by the rotating collar through said apertures or, either in conjunction with said surface 53 or in place thereof, a deflector plate 54, in the form of an inverted truncated cone, may be positioned in the path of the oil moving outwardly under the action of centrifugal force so as to deflect said oil upwardly through the apertures 51.

The circulation of air induced by the movement of oil at its free surface may also be taken advantage of in dissipating the heat, the air channels 39 between successive pairs of ribs 50 communicating adjacent their outer ends with air passages 41 formed in the wall of the housing as in the embodiment of Fig. 1—or in place thereof, the construction shown in Fig. 3 may be employed if desired. In the embodiment of Fig. 2 the housing is shown as formed in two sections separable at the joint 55 to facilitate access to the interior of the oil reservoir and to the bearing parts. The housing shown in Fig. 1 could be similarly constructed in two sections if desired.

In operation, the oil circulating within the reservoir 26 under the action of centrifugal force is brought into heat interchanging relation with the peripheral wall of the housing or reservoir and gives up its heat thereto, this conduction of heat to the exterior wall of the housing or reservoir being greatly facilitated by the inwardly projecting ribs 32, or 49, 50, which project a substantial distance into the oil along both its periphery and its free surface so as to constitute heat conducting elements for transferring the heat to the exterior wall of the reservoir or housing. From the exterior wall of the housing or reservoir the heat is readily dissipated by the action of the exterior heat-conducting elements 31 and the currents of air which flow through the channels afforded by said elements, particularly when a vigorous circulation of air over and between the ribs 31 is maintained by air circulating means. The movement of the oil at its surface induces circulation of the air within the housing or reservoir, and when the bearing is provided with interior air passages or channels as illustrated, this circulation of air further facilitates the dissipation of the heat to the housing wall and outside air. When the speed of rotation of the shaft is such that there is danger of the oil and air being churned together at the free surface of the oil, means may be employed, as shown in Fig. 2, for preventing such churning of the oil and air without interfering with the dissipation of heat through the wall of the housing or reservoir.

It will therefore be perceived that I have invented a thrust bearing wherein the oil is caused to circulate in heat interchanging relation with the wall of the reservoir or housing and the heat dissipated into the outside air without requiring the use of a system for circulating a cooling liquid through the bearing parts or the lubricating oil and without requiring the use of a system for circulating the lubricating oil through external cooling devices. Furthermore, by providing ribs on the exterior of the housing or reservoir, not only do they constitute heat-radiating elements, but they provide exterior air channels through which a circulation may be maintained by convection, or by air circulating means, to readily abstract heat from the wall of the housing or reservoir. Also, by providing interior heat-conducting elements in heat interchanging relation with the exterior air channels, the heat may be readily abstracted from the body of the oil and conducted to the walls of said channels for dissipation as aforesaid. Additionally, means have been provided whereby the circulation of air within the housing or reservoir is taken advantage of in facilitating the dissipation of heat. Moreover, these several features of construction have been combined with means for preventing churning of the air and oil at the free surface of the oil without impairing the capacity of the housing or reservoir to dissipate the heat developed by the friction in the bearing.

While the invention has been shown as embodied only in bearings for vertical shafts, it is to be expressly understood that the invention may also be applied to bearings for horizontal or inclined shafts. Furthermore, while the embodiments of the invention illustrated on the drawings have been described with considerable particularity, it is to be expressly understood that the invention is not limited thereto, as the same is capable of receiving a variety of mechanical expressions, some of which will now readily suggest themselves to those skilled in the art, while certain features may be used without other features thereof, and changes may be made in the details of construction and arrangement of parts without departing from the spirit of this invention. Reference is therefore to be had to the claims hereto appended for a definition of the limits of said invention.

What is claimed is:—

1. In a thrust bearing, the combination with relatively-rotatable thrust-bearing members, of a housing therefor providing a reservoir for the lubricating oil in which a circulation of oil is maintained, said housing having heat conducting ribs in heat transferring relation with said housing and projecting into heat-interchanging relation with the circulating oil in said reservoir.

2. In a thrust bearing, the combination with relatively-rotatable thrust-bearing members, of a housing therefor providing a reservoir for the lubricating oil in which a circulation of oil is maintained, said housing having air channels in heat-interchanging relation with the circulating oil in said reservoir, and heat-conducting ribs in heat transferring relation with said housing and projecting into the oil circulating in said reservoir.

3. In a thrust bearing, the combination with a shaft and relatively-rotatable thrust-bearing members therefor, of a housing for the bearing including a reservoir for the lubricating oil, said housing being provided with air channels extending lengthwise of the shaft in heat-interchanging relation with the bearing, and means driven by the rotation of said shaft for circulating air through said channels.

4. In a thrust bearing, the combination with a shaft and relatively-rotatable thrust-bearing members therefor, of a housing for the bearing including a reservoir for the lubricating oil, said housing being provided with air channels extending lengthwise of the shaft in heat-interchanging relation with the bearing, elements for conducting heat from the oil in said reservoir to the walls of said channels, and means driven by the rotation of said shaft for circulating air through said channels.

5. In a thrust bearing, the combination with relatively-rotatable thrust-bearing members, of a housing therefor including an oil reservoir and having exterior heat-conducting ribs over and between which air may circulate to cool the oil in said reservoir, and means whereby air is circulated through the channels afforded by said ribs.

6. In a thrust bearing, the combination with relatively-rotatable thrust bearing members, of a housing therefor including an oil reservoir and having exterior heat-conducting ribs over and between which air may circulate to cool the oil in said reservoir, means whereby air is circulated through the channels afforded by said ribs, and means to conduct heat from the oil to the walls of said channels.

7. In a thrust bearing, the combination with relatively-rotatable thrust-bearing members, of a housing therefor including a reservoir for the lubricating oil, said housing having vertically-extending exterior ribs for dissipating heat and providing exterior channels through which air may circulate vertically.

8. In a thrust bearing, the combination of relatively-rotatable thrust-bearing members, of a housing therefor including an oil reservoir and having exterior air channels through which air may circlate to abstract heat from the oil in said reservoir, and means whereby air is caused to flow through said channels.

9. In a thrust bearing, the combination of relatively-rotatable thrust-bearing members, of a housing therefor including an oil reservoir and having exterior air channels through which air may circulate to abstract heat from the oil in said reservoir, interior heat-conducting elements for conveying heat to the walls of said channels, and means whereby air is caused to flow through said channels.

10. In a thrust bearing, the combination with relatively-rotatable thrust-bearing members, of an oil reservoir having interior ribs in heat transferring relation therewith and projecting into the circulating oil to direct the oil circulation and abstract heat from the oil.

11. In a thrust bearing, the combination with relatively-rotatable thrust-bearing members, of an oil reservoir having interior ribs to direct the oil circulation and abstract heat from the oil, and exterior air channels through which air may circulate to cool the bearing.

12. In a thrust bearing, the combination with relatively-rotatable thrust-bearing members, of an oil reservoir having interior ribs to direct the oil circulation and abstract heat from the oil, exterior air channels on said reservoir, and means whereby air is caused to flow through said channels.

13. In a thrust bearing, the combination with relatively-rotatable thrust-bearing members, of a housing providing an oil reservoir and having exterior channels through which air may circulate to cool the bearing, and means in the interior of said housing whereby air currents set up by movement of the oil may assist in cooling the bearing.

14. In a thrust bearing, the combination with relatively-rotatable thrust-bearing members, of a housing providing an oil reservoir and having exterior channels through which air may circulate to cool the bearing, and channels interiorly of the housing through which air set in motion by the movement of the oil may circulate to give up heat to said housing.

15. In a thrust bearing, the combination with relatively-rotatable thrust-bearing members, of a housing providing an oil reservoir and having exterior channels through which air may circulate to cool the bearing, ribs on said housing projecting into the oil, and air channels communicating with the inter-rib spaces above the level of the oil whereby an interior air circulation is set up between said ribs.

16. In a thrust bearing, the combination with relatively-rotatable thrust-bearing members, of a housing providing an oil reservoir, and air channels in said housing whereby the air set in motion by the circulation of the oil may give up its heat to the housing.

17. In a thrust bearing, the combination with relatively-rotatable thrust-bearing members, of a housing providing an oil reservoir, and ribs on said housing projecting interiorly thereof and providing channels through which the air in said housing may circulate to give up heat to said housing.

18. In a thrust bearing, the combination with relatively-rotatably thrust bearing members, of a housing providing an oil reservoir, ribs on said housing projecting into the oil, and air channels communicating with the interrib spaces above the level of the oil whereby air currents may be set up in said housing to convey heat thereto.

19. In a thrust bearing, the combination with relatively-rotatable thrust-bearing members, of a housing therefor providing an oil reservoir, means in said housing for directing the air circulation whereby heat may be conveyed by the air to said housing, and means for circulating air over the exterior of said housing.

20. In a thrust bearing, the combination with relatively-rotatable thrust-bearing members, of a housing therefor providing an oil reservoir, means in said housing for directing the air circulation whereby heat may be conveyed by the air to said housing, and exterior heat-conducting ribs on said housing.

21. In a thrust bearing, the combination with relatively-rotatable thrust-bearing members, of a housing providing an oil reservoir, means adjacent the periphery of the rotatable bearing member to prevent churning of the air and oil, heat-conducting ribs on the housing projecting into the free surface of the oil, and means in the reservoir whereby the circulating oil is directed into heat-interchanging relation with said ribs.

22. In a thrust bearing, the combination with relatively-rotatable thrust-bearing members, of a housing providing an oil reservoir and having ribs projecting into the free surface of the oil, and a baffle plate in said reservoir below the free surface of the oil, said baffle plate being apertured to permit circulation of the oil into heat-interchanging relation with said ribs.

23. In a thrust bearing, the combination with relatively-rotatable thrust-bearing members, of a housing therefor providing an oil reservoir and having ribs projecting into the free surface of the oil, means in said reservoir to prevent churning of the free surface of the oil, and means whereby oil may circulate to and from the free surface of the oil and into heat-interchanging relation with said ribs.

24. In a thrust bearing, the combination with relatively-rotatable thrust-bearing members, of a housing therefor providing an oil reservoir and having ribs projecting into the free surface of the oil, means in said reservoir to prevent churning of the free surface of the oil, means whereby the oil may circulate to and from the free surface of the oil, and means in said housing for directing the air circulation whereby the moving air may give up heat to the housing and ribs.

25. In a thrust bearing, the combination with relatively-rotatable thrust-bearing members, of a housing therefor providing an oil reservoir and having ribs projecting into the free surface of the oil, means in said reservoir to prevent churning of the free surface of the oil, means whereby the oil may circulate to and from the free surface of the oil, and means for circulating air over the exterior of said housing.

26. In a thrust bearing, the combination with relatively-rotatable thrust bearing members, of a housing therefor providing an oil reservoir and having ribs projecting into the free surface of the oil, means in said reservoir to prevent churning of the free surface of the oil, means whereby the oil may circulate to and from the free surface of the oil, and heat-conducting elements on the exterior of the housing for giving up heat to the air.

27. In a thrust bearing, the combination with relatively-rotatable thrust bearing members, of a housing therefor providing an oil reservoir and having ribs projecting into the free surface of the oil, means in said reservoir to prevent churning of the free surface of the oil, means whereby the oil may circulate to and from the free surface of the oil, and air channels on the exterior of the housing through which air may circulate to abstract heat from said housing.

28. In a thrust bearing for a vertical shaft, the combination of relatively-rotatable thrust-bearing members, of a housing therefor providing an oil reservoir and extending over the free surface of the oil in the reservoir, and ribs projecting into the oil from the peripheral and over-extending portions of the housing to conduct heat thereto.

29. In a thrust bearing for a vertical shaft, the combination of relatively-rotatable thrust-bearing members, of a housing therefor providing an oil reservoir and extending over the free surface of the oil in the reservoir, ribs projecting into the oil from the peripheral and over-extending portions of the housing to conduct heat thereto, and exterior heat-conducting ribs on said housing.

30. In a thrust bearing, the combination with relatively-rotatable thrust-bearing members, of a housing for the bearing including a reservoir for the lubricating oil and having elements in heat-interchanging relation with the oil in said reservoir, and means whereby air is caused to flow over said housing to abstract the heat conveyed thereto by said elements.

31. In a thrust bearing, the combination with relatively rotatable thrust-bearing members, of a housing providing an oil reservoir, ribs on said housing projecting interiorly thereof and providing channels through which the air in said housing may circulate to give up heat to said housing, and exterior heat-dissipating ribs on said housing.

32. In a thrust bearing, the combination with relatively rotatable thrust-bearing members, of a housing providing an oil reservoir, ribs on said housing projecting interiorly thereof and providing channels through which the air in said housing may circulate to give up heat to said housing, exterior air channels on said housing, and means whereby air is circulated through said channels to abstract heat therefrom.

33. In a thrust bearing for a vertical shaft, the combination of relatively rotatable thrust-bearing members, of a housing therefor providing an oil reservoir and extending over the surface of the oil in said reservoir, and ribs projecting downwardly into the oil from the over-extending portions of said housing.

34. In a thrust bearing, the combination with relatively rotatable thrust-bearing members, of a housing providing an oil reservoir in which a circulation of oil is maintained by the rotation of the rotatable bearing member, ribs on said housing for dissipating the heat from the circulating oil, and means in said reservoir for preventing churning together of the air and oil.

35. In a thrust bearing, the combination with relatively rotatable thrust-bearing members, of a housing providing an oil reservoir in which a circulation of oil is maintained by the rotation of the rotatable bearing member, exterior ribs on said housing providing channels through which air may circulate, and means in said reservoir for preventing churning together of the air and oil.

36. In a thrust bearing, the combination with relatively rotatable thrust-bearing members, of a housing providing an oil reservoir in which a circulation of oil is maintained by the rotation of the rotatable bearing member, ribs on said housing, means whereby air is caused to flow between the ribs to abstract heat therefrom, and means in said reservoir for preventing churning together of the air and oil.

37. In a thrust bearing, the combination with relatively rotatable thrust-bearing members, of a housing providing an oil reservoir in which a circulation of oil is maintained by the rotation of the rotatable bearing member, exterior heat-conducting elements on said housing, interior heat-conducting elements projecting into the oil in said reservoir, and means in said reservoir preventing churning together of the air and oil.

38. In a thrust bearing, the combination with relatively rotatable thrust-bearing members, of a housing providing an oil reservoir in which a circulation of oil is maintained by the rotation of the rotatable bearing member, interior ribs projecting into the circulating oil for conducting heat from said oil to the housing, and means in said reservoir for preventing churning together of the air and oil.

39. In a thrust bearing, the combination with relatively rotatable thrust-bearing members, of a housing providing an oil reservoir and having ribs projecting into the free surface of the oil, and means in said reservoir for deflecting oil into heat-interchanging relation with said ribs.

40. In a thrust bearing, the combination with relatively rotatable thrust-bearing members, of a housing therefor providing a reservoir for the lubricating oil in which a circulation of oil is maintained, ribs on said housing projecting into the circulating oil to conduct heat therefrom to the housing, and exterior ribs on said housing for dissipating the heat.

41. In a thrust bearing, the combination with relatively-rotatable thrust-bearing members, of a housing therefor providing a reservoir for the lubricating oil in which a circulation of oil is maintained, ribs on said housing projecting into the circulating oil to conduct heat therefrom to the housing, exterior ribs on said housing for dissipating the heat, and means associated with said bearing whereby air is circulated between said exterior ribs to facilitate the dissipation of heat.

42. In a thrust bearing, the combination with relatively-rotatable thrust bearing members, of a housing for the bearing including a reservoir for the lubricating oil, air channels formed exteriorly of said housing, means whereby air is caused to flow through said channels, and means whereby the heat of the lubricating oil is transferred to the air circulating through said channels.

43. In a thrust bearing, the combination with a shaft and relatively-rotatable members for taking the thrust of said shaft, a housing for the bearing including a reservoir for the lubricating oil, and means for air-cooling said oil including air channels outside of said bearing housing, a fan driven by said shaft for circulating air through said channels, and means whereby the heat of said oil is conveyed to the air circulating through said channels.

44. In a thrust bearing, in combination with relatively-rotatable thrust-bearing members, a reservoir for the lubricating oil, ribs in said reservoir projecting into the oil for conducting heat from said oil to the wall of said reservoir, and means whereby air is circulated over the wall of said reservoir to abstract heat therefrom.

In testimony whereof I have signed this specification.

HARRY A. S. HOWARTH.